United States Patent [19]

Nagata et al.

[11] Patent Number: 5,708,867
[45] Date of Patent: Jan. 13, 1998

[54] INTERCONNECTION MECHANISM FOR ZOOM CAMERA

[75] Inventors: Kazuaki Nagata; Hideo Kobayashi, both of Saitama, Japan

[73] Assignee: Fuji Photo Optical Co., Ltd., Saitama, Japan

[21] Appl. No.: 785,768

[22] Filed: Jan. 21, 1997

[30] Foreign Application Priority Data

Jan. 31, 1996 [JP] Japan ..................... 8-016217

[51] Int. Cl.⁶ .......................... G03B 13/08; G03B 15/03
[52] U.S. Cl. ..................... 396/62; 396/175; 396/379
[58] Field of Search ..................... 396/61, 62, 175, 396/378, 379

[56] References Cited

U.S. PATENT DOCUMENTS

| 4,609,269 | 9/1986 | Kamata | 396/155 |
|---|---|---|---|
| 4,951,074 | 8/1990 | Ueda | 396/175 |
| 5,280,315 | 1/1994 | Nomura et al. | 396/175 |
| 5,335,030 | 8/1994 | Sozuka | 396/379 |
| 5,570,149 | 10/1996 | Wakabayashi et al. | 396/175 |

FOREIGN PATENT DOCUMENTS 2-78937  6/1990  Japan .

*Primary Examiner*—Safet Metjahic
*Assistant Examiner*—Nicholas J. Tuccillo
*Attorney, Agent, or Firm*—Young & Thompson

[57] ABSTRACT

An interconnection mechanism for a zoom camera having a zoom finder and a zoom flash is comprised of a finder zooming cam rotating in cooperation with a zoom lens, and a flash angle changing cam rotating in cooperation with the finder zooming cam. The finder zooming cam has at least a helicoid cam surface and a rotational axis extending in parallel to a moving path of a movable lens element of the zoom finder. The flash angle changing cam has at least a helicoid cam surface and a rotational axis extending in parallel to the rotational axis of the finder zooming cam. The flash angle changing cam is disposed adjacent to the finder zooming cam, and rotates with the finder zooming cam through gears. These cams are disposed between the zoom finder and the zoom flash. A cam follower pin provided on a lens frame of the movable lens is engaged with the helicoid cam surface of the finder zooming cam such that the movable lens element moves along the moving path in response to rotation of the finder zooming cam, thereby changing the magnification of the zoom finder. A pair of cam follower claws provided on a flash projecting portion of the zoom flash are engaged with the helicoid cam surface of the flash angle changing cam such that the flash angle projecting portion moves in the direction of the rotational axes in response to rotation of the flash angle changing cam, thereby changing the projection angle of flash light.

6 Claims, 7 Drawing Sheets

INTERCONNECTION MECHANISM FOR ZOOM CAMERA

BACKGROUND OF THE INVENTION

1. Field of the Invention

The present invention relates to an interconnection mechanism for a zoom camera having a zoom finder and a flash device which cooperate with a zoom lens. More particularly, the present invention relates to an interconnection mechanism that contributes to making the zoom camera compact.

2. Background Arts

A compact zoom camera is provided with a zoom finder wherein at least a lens element of a finder optical system is movable in an axial direction of the finder optical system to change its magnification in cooperation with the zooming of the zoom lens. There is also a compact zoom camera having a flash device whose light projection angle is automatically changed in cooperation with the zooming such that the projection angle is wider in the wide-angle side of the zoom lens, and narrower in the tele-photo side. Hereinafter, such a flash device will be referred to as a zoom flash. The zoom flash has a flash projecting portion that moves in cooperation with the zooming of the zoom lens, to change the distance from a flash window constituted of a Fresnel lens, thereby changing the angle of flash light in accordance with the magnification of the zoom lens.

This type of compact zoom camera has an interconnection mechanism for making the flash projecting portion of the zoom flash move in cooperation with the movable lens element of the zoom finder. As an example of the interconnection mechanism, JPU 2-78937 discloses a flat cam plate which extends over a zoom finder and a flash projecting portion so as to be slidable in a horizontal direction in cooperation with a zoom lens. The cam plate has three cam grooves which are engaged with two movable lens elements of the zoom finder and the flash projecting portion, respectively, such that the movable lens elements and the flash projecting portion move along the cam grooves with the sliding movement of the cam plate in accordance with the magnification of the zoom lens.

Since it is necessary to provide a sufficient room for the cam plate to slide, this known interconnection mechanism is disadvantageous in terms of compactness.

SUMMARY OF THE INVENTION

An object of the present invention is to provide an interconnection mechanism for a zoom camera having a zoom finder and a zoom flash, which can be mounted in a small space, and thus contributes to making the zoom camera compact.

To achieve the above object, the present invention provides an interconnection mechanism for a zoom camera which comprises a finder zooming cam rotating in cooperation with the zoom lens being zoomed, the finder zooming cam having a rotational axis extending in parallel to a moving path of a movable lens of a zoom finder, and at least a helicoid cam surface; a cam follower member provided on the movable lens and engaged with the cam surface of the finder zooming cam such that the movable lens moves along the moving path in response to rotation of the finder zooming cam; a flash angle changing cam rotating in cooperation with the zoom lens being zoomed, the flash angle changing cam having a rotational axis extending in parallel to the rotational axis of the finder zooming cam, and at least a helicoid cam surface, the flash angle changing cam being disposed adjacent to the finder zooming cam; and a cam follower member provided on a flash projecting portion of a zoom flash and engaged with the cam surface of the flash angle changing cam such that the flash projecting portion moves in the direction of the rotational axes in response to rotation of the flash angle changing cam.

According to this construction, the space or room for the interconnection mechanism is relatively small and unchanged in any positions of the zoom finder and the zoom flash. Therefore, the zoom camera can be compact with the interconnection mechanism of the present invention.

According to a preferred embodiment, the zoom finder comprises an objective lens, an eyepiece and a prism disposed between the objective lens and the eyepiece for refracting optical path of the zoom finder such that the objective lens and the eyepiece being spaced in vertical and horizontal directions of the zoom camera, as well as in an axial direction of the zoom lens. The finder zooming cam and the flash angle changing cam are disposed in a room formed above or below the eyepiece and between the objective lens and the flash projecting portion.

This construction makes a real image type zoom finder having a relatively long light path compact by refracting the light path, while accommodating the interconnection mechanism in the room between the objective lens and the eyepiece.

The interconnection mechanism can be mores simplified by coupling the finder zooming cam to the flash angle changing cam through gears which are respectively formed coaxially with the rotational axes of the cams. Thereby, it is only necessary to transmit the movement of the zoom lens to either one of these cams. In addition, the compact interconnection mechanism improve the adaptability in design of the camera.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
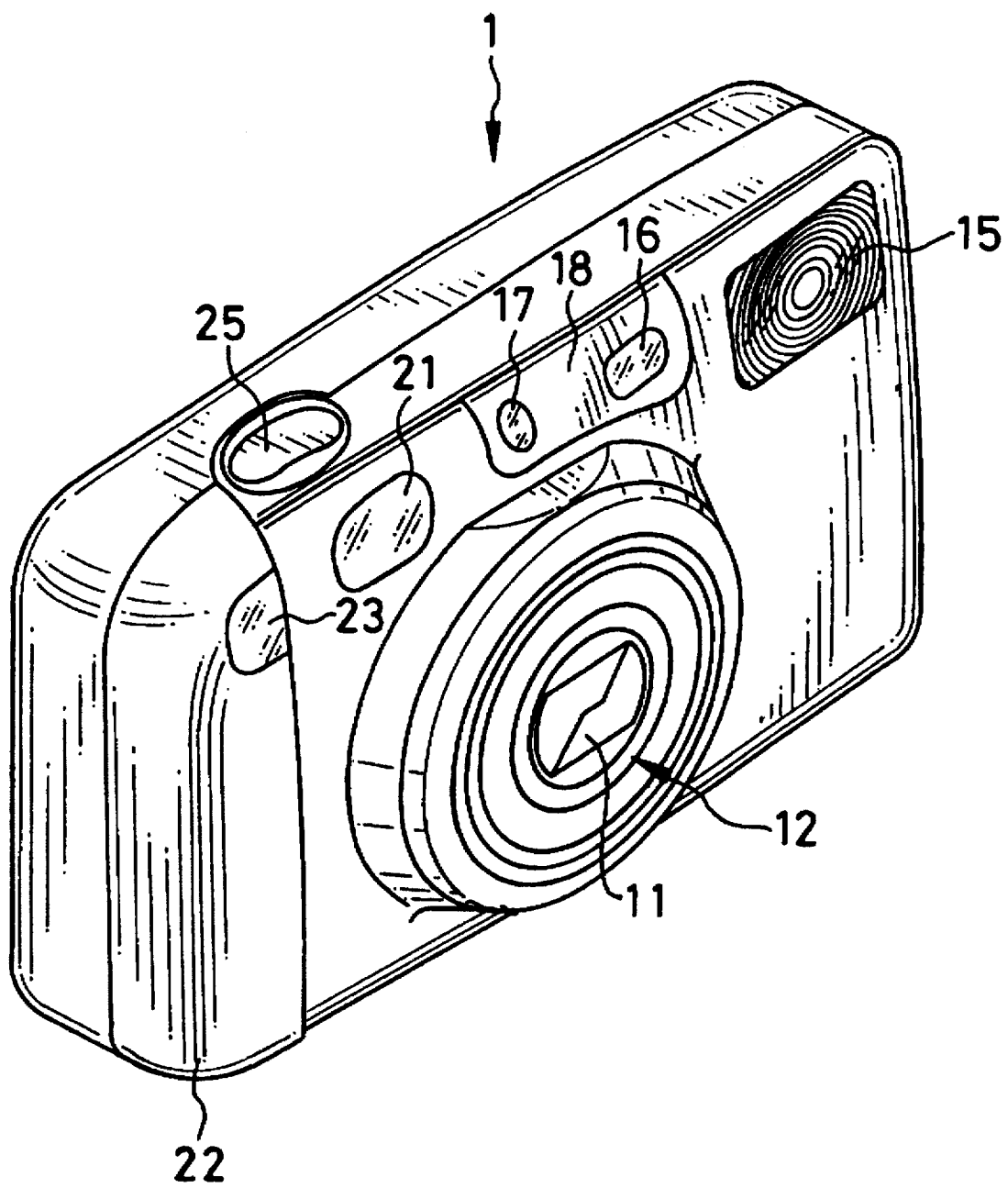
FIG. 1 is a front perspective view of a zoom camera having an interconnection mechanism between a zoom finder and a flash projecting portion of a zoom flash, according to an embodiment of the present invention.

In FIG. 1, a camera 1 has a zoom lens 12 with a protection barrier 11 on a front thereof. On an upper front portion of the camera above the zoom lens 12, a flash window 15, a finder objective window 16, a photometric light projection window 17 and a photometric light reception window 21 are arranged in a line. The flash window 15 is provided with a Fresnel lens. The photometric light reception window 21 is to receive light projected from the photometric light projection window 17 and reflected by an object, to use the reflected light for auto-focusing. The finder objective window 16 and the photometric light projection window 17 are formed as an integral part 18. A grip 22 is provided with an indication window 23, behind which a red indication lamp for a self-timer and a remote control signal receiver are disposed. A shutter button 25 is disposed on a top side of the camera.

Figure 2:
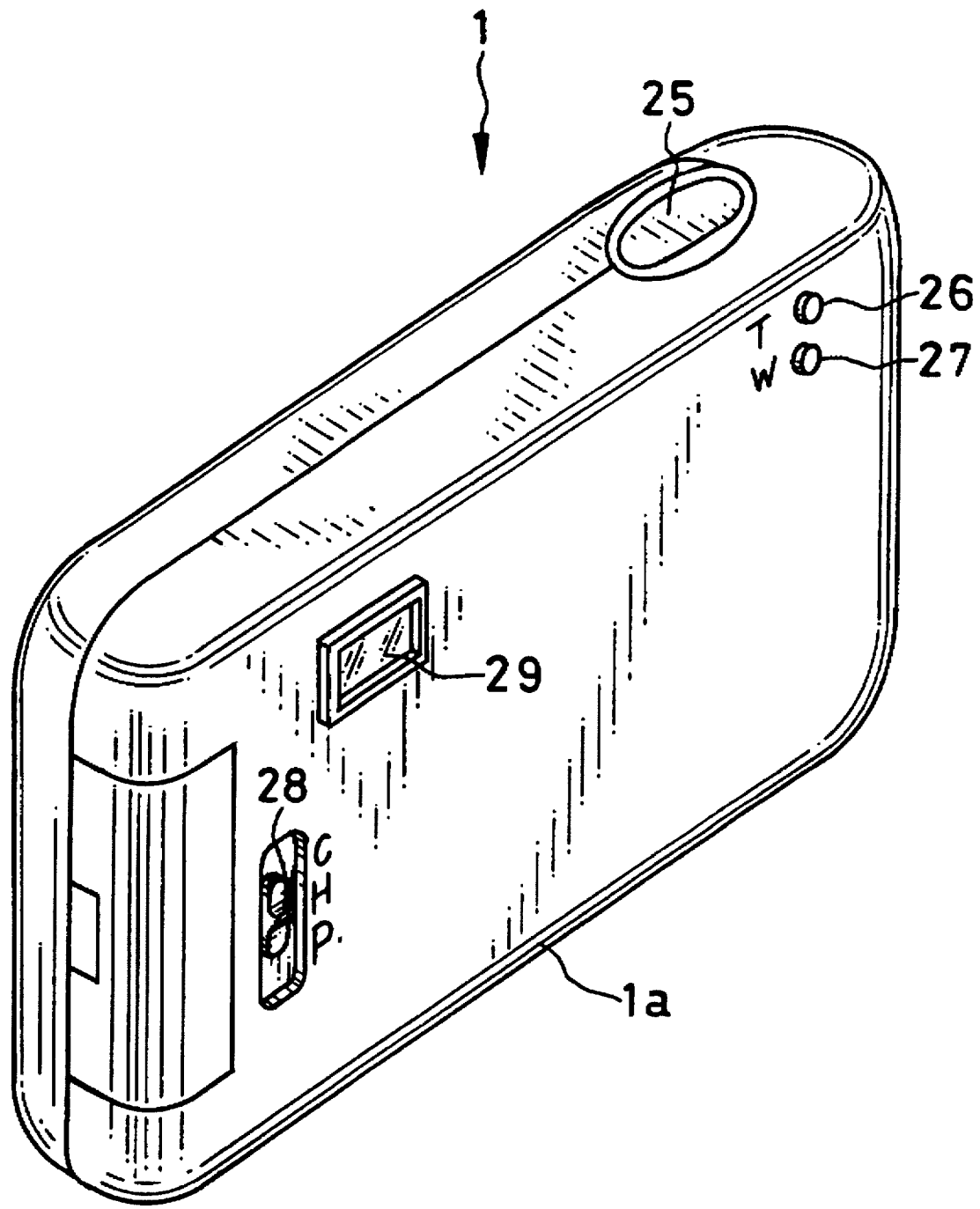
FIG. 2 is a rear perspective view of the zoom camera shown in FIG. 1.

As shown in FIG. 2, a zooming button 26 for zooming the zoom lens 12 toward a telephoto (T) position and a zooming button 27 for zooming the is zoom lens 12 toward a wide (W) position are disposed on the right hand of a rear side 1a of the camera 1. On the light hand of the rear side 1a, there is a view changing switch 28 for changing the field of view between a standard or H-size having an aspect ratio of 1.8, a C-size having an aspect ratio of 1.5 and a panoramic- or P-size having an aspect ratio of 3. A finder eyepiece window 29 is formed on an upper right portion of the rear side 1a.

Figure 3:
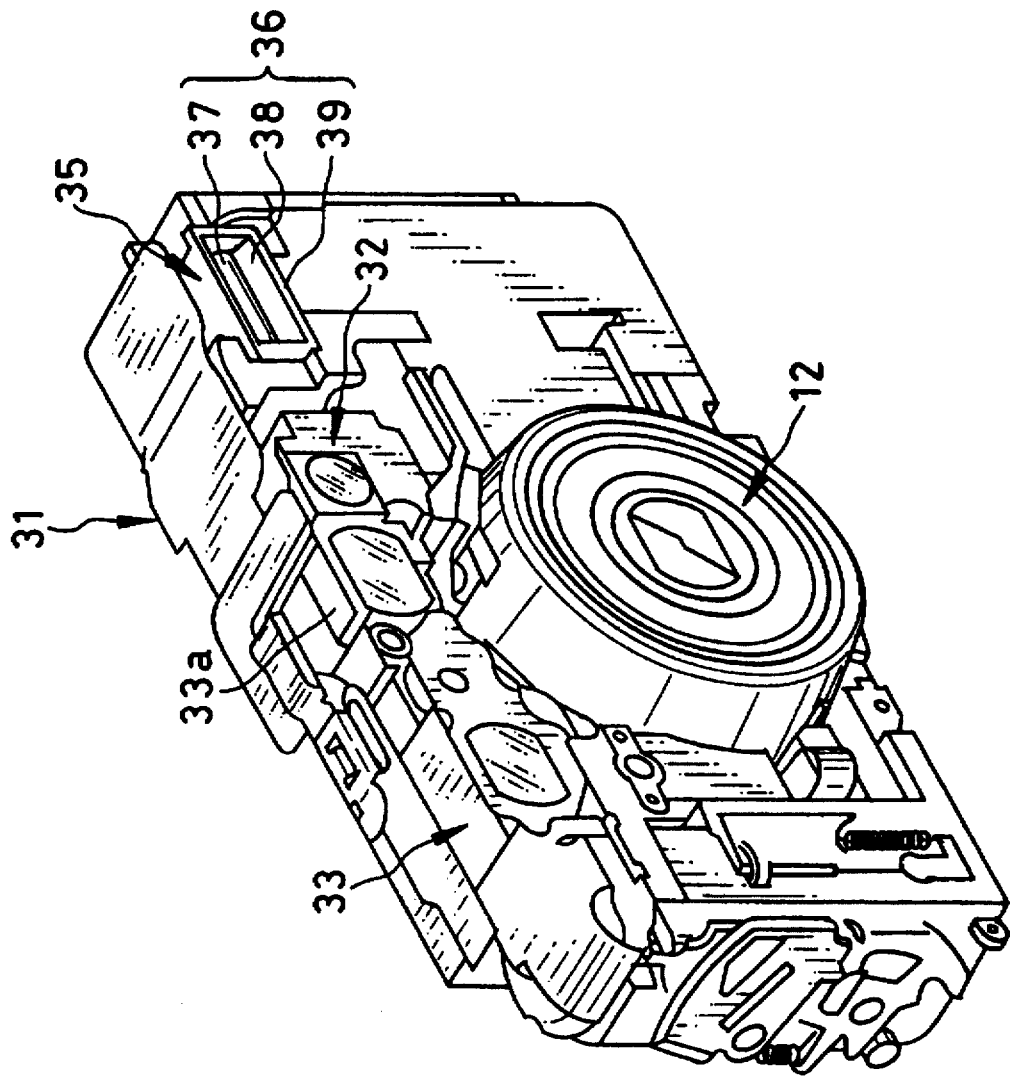
FIG. 3 is a front perspective view of a main body of the zoom camera of FIG. 1, excluding an exterior housing of the zoom camera.

Referring to FIG. 3 showing a main body 31 of the camera 1, an real image type zoom finder 32 is incorporated with a holder frame 33a of a photometric unit 33 for the auto-focusing. A flash projecting portion 36 of a zoom flash 35 is arranged adjacent to the zoom finder 32. The flash projecting portion 36 is constituted of a discharge tube 37, a reflector 38 and a frame 39 holding the discharge tube 37 and the reflector 38. A well-known flash circuit is disposed below the flash projecting portion 36, though it is omitted from the drawings.

Figure 4:
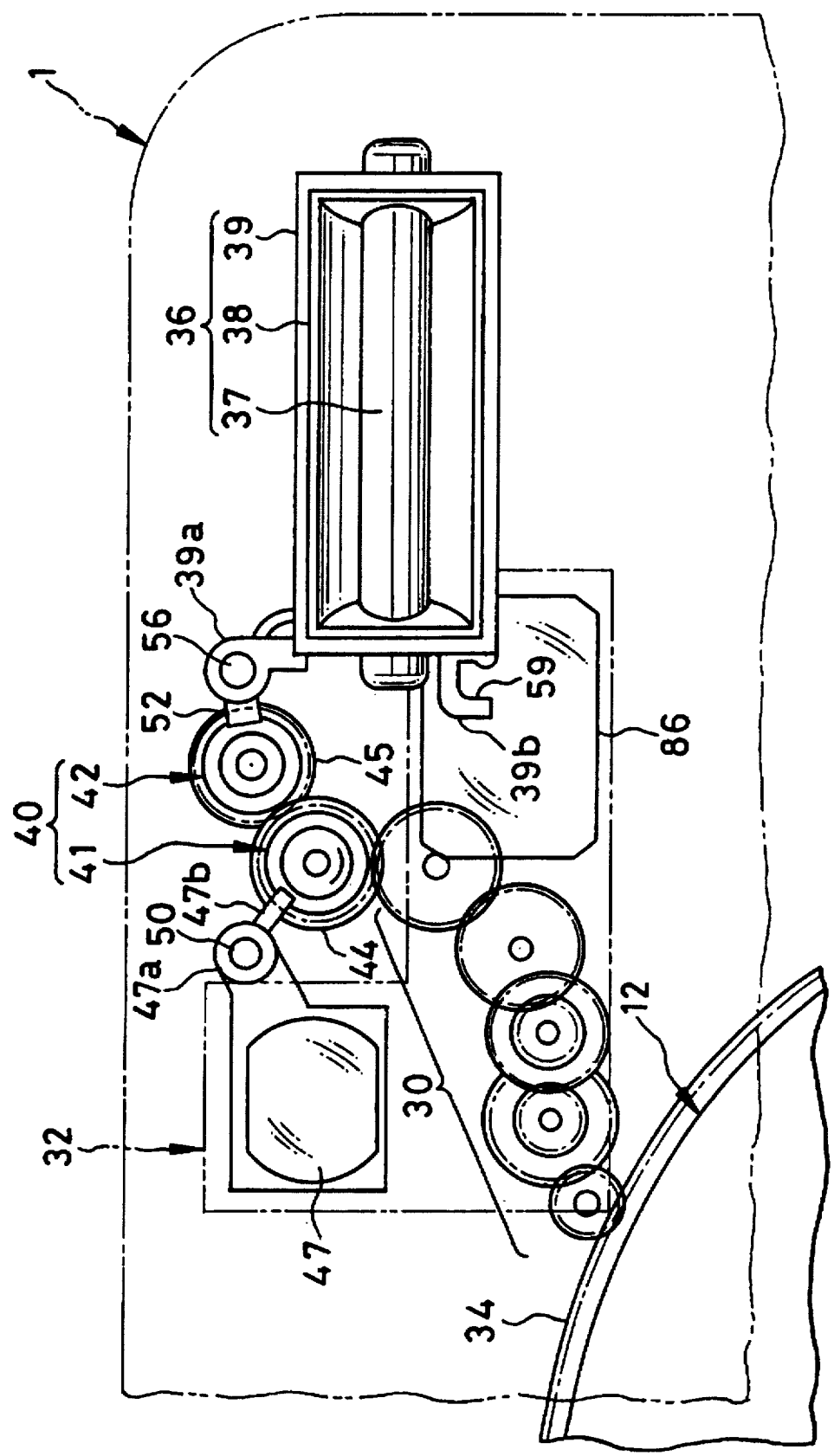
FIG. 4 is an enlarged front view of the interconnection mechanism.
Figure 5:
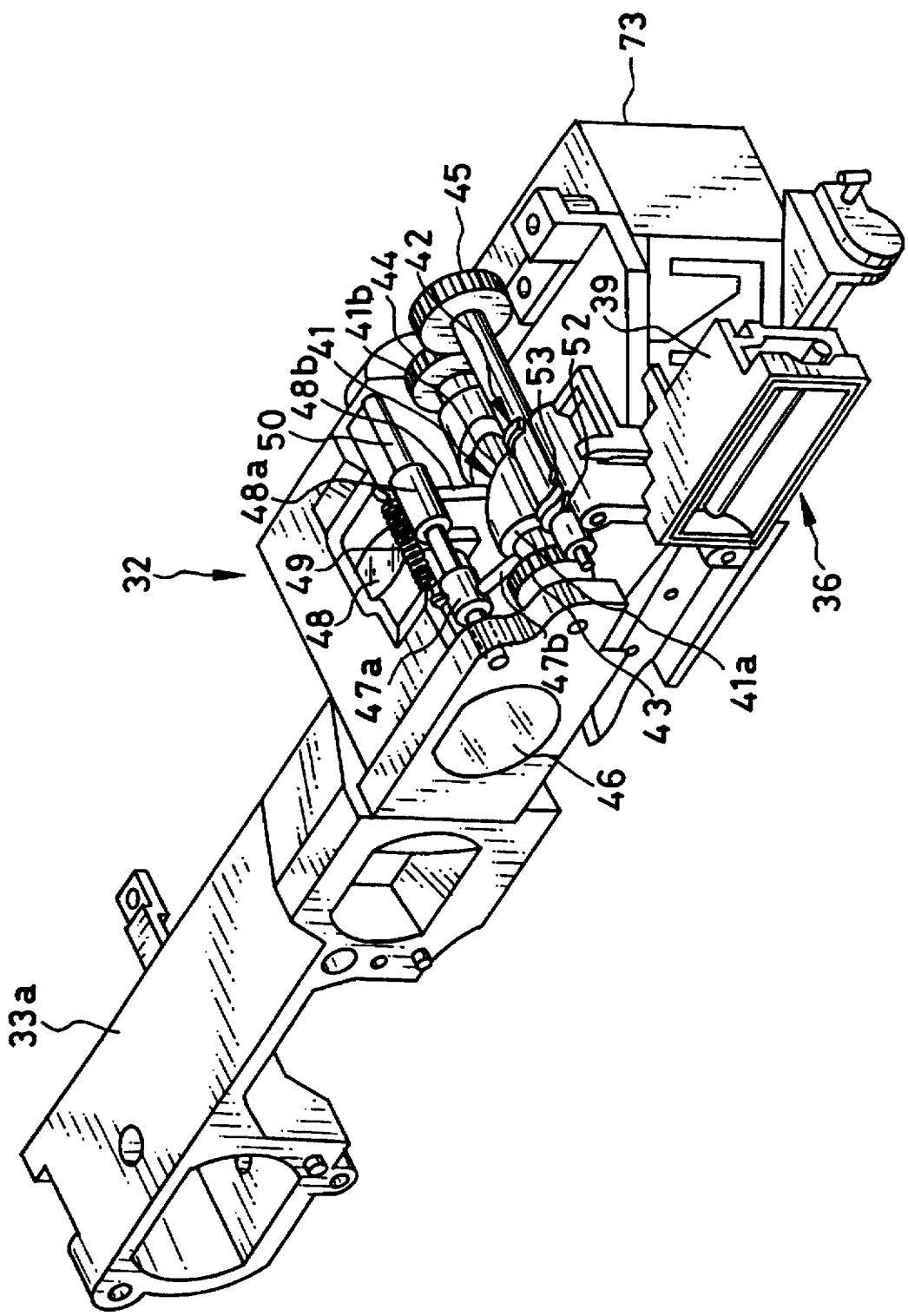
FIG. 5 is an enlarged perspective view of the interconnection mechanism.

As shown in FIGS. 4 and 5, an interconnection mechanism 40 for moving the zoom finder 32 and the flash projecting portion 36 in cooperation with zooming the zoom lens 12. The interconnection mechanism 40 is constituted of a finder zooming cam 41 and a cam 42 for changing the angle of flash light projected from the flash projection window 15. Hereinafter, the cam 42 will be referred to as the flash angle changing cam 42. The finder zooming cam 41 and the flash angle changing cam 42 are helicoid cams whose rotational axes extend in parallel to a moving path of movable lenses 47 and 48 of the zoom finder 32 (see FIG. 7).

Gears 43 and 44 are secured to ends of the finder zooming cam 41. One gear 43 is coupled to a zooming gear 34 for the zoom lens 12 through a gear train 30. The other gear 44 of the finder zooming cam 41 is in mesh with a gear 45 which is secured to an end of the flash angle changing gear 42. The finder zooming cam 41 has two lines of cam surfaces 41a and 41b whose helicoid angles are different from each other.

The movable lenses 47 and 48 are disposed behind an objective lens 46 of the zoom finder 32. The movable lenses 47 and 48 are respectively held in lens frames 47a and 48a. The lens frames 47a and 48a are supported movable along a guide axle 50 which extends in parallel to the rotational axes of the cams 41 and 42. A coil spring 49 is suspended between the lens frames 47a and 48a to urge them to move toward each other. Cam follower pins 47b and 48b are formed on the lens frames 47a and 48a, and are pressed onto the cam surfaces 41a and 41b of the finder zooming cam 41, respectively, under the force of the coil spring 49, as shown in FIG. 5. In response to rotation of the finder zooming cam 41, the cam follower pins 47b and 48b slide on the cam surfaces 41a and 41b, to move in the axial direction of the cam 41 by different amounts according to the difference in the helicoid angles of the cam surfaces 41a and 41b. As a result, the movable lenses 47 and 48 move axially by different amounts, changing the magnification of the zoom finder 32.

The flash angle changing cam 42 is engaged with the flash projecting portion 36 through a pair of cam follower claws 52 and 53, which are formed on the frame 39 of the flash projecting portion 36. The cam follower claws 52 and 53 are spaced in the axial direction of the cam 42 by a distance to nip a helicoid rail of the cam 42. In response to rotation of the cam 42, the portion 36 moves continuously in the axial direction of the cam 42, so that the distance of the portion 36 from the flash window 15 changes. As the distance decreases, the projection angle of the flash light becomes wider, so that the illumination range becomes wider. On the contrary, the projection angle of the flash light and thus the illumination range become narrower, as is the portion 36 moves closer to the flash window 15.

Figure 6:
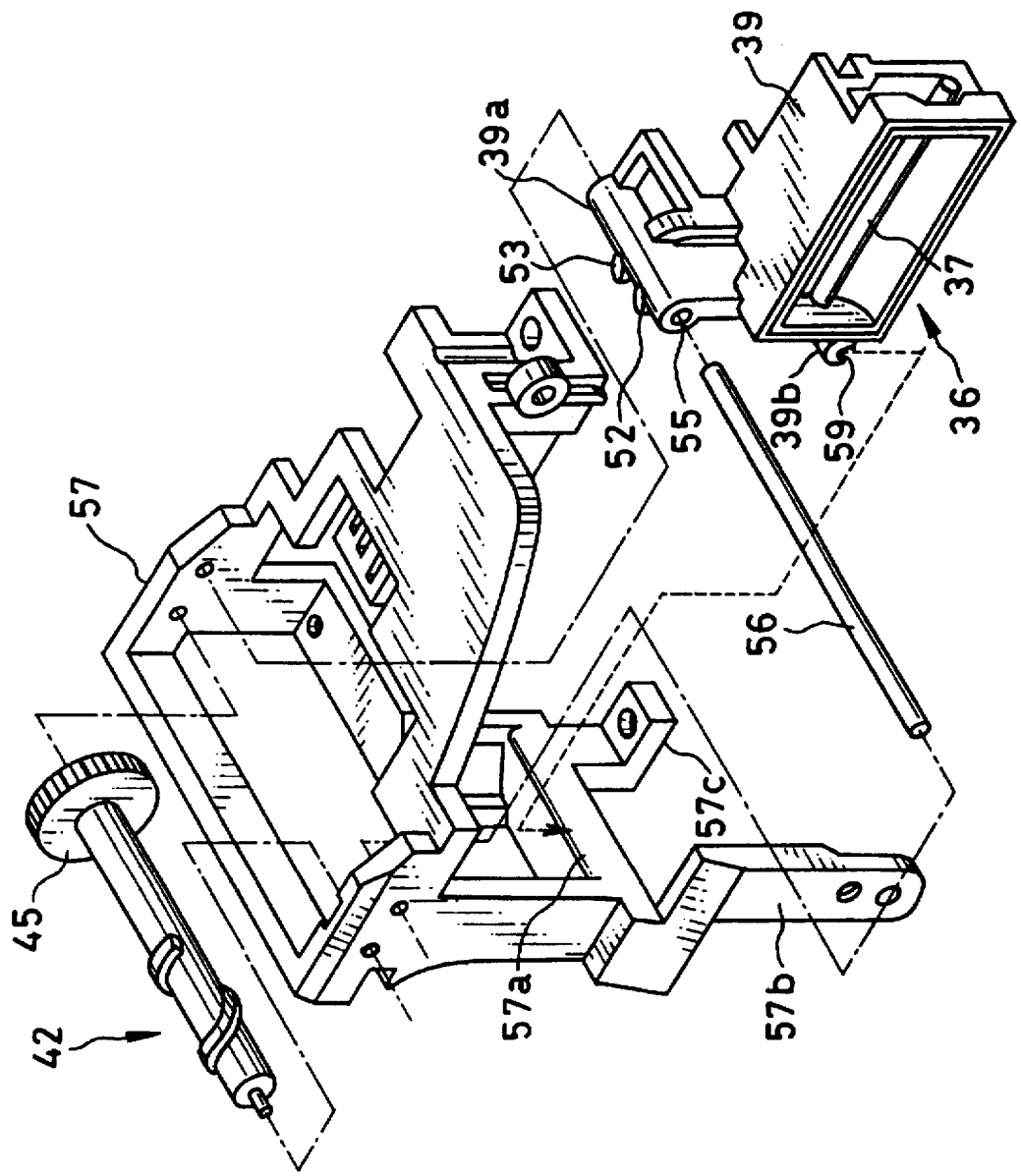
FIG. 6 is an exploded perspective view illustrating a holding frame for the flash projecting portion and a flash angle changing cam.

As shown in FIG. 6, the frame 39 of the portion 36 has an arm 39a, through which a tunnel-like hole 55 is formed to insert a guide axle 56. The guide axle 56 is mounted adjacent to the cam 42 on an upper portion of a flash frame 57 in parallel with the rotational axis of the cam 42. The cam follower claws 52 and 53 are formed on the arm 39a. A supporting member 39b is formed below the arm 39a integrally with the frame 39. The supporting member 39b has a guide groove 59 along its bottom. The guide groove 59 is engaged with a guide rail 57a of the flash frame 57, which extends in parallel to the guide axle 56. In this way, the portion 36 hangs from the guide axle 56, and is supported on the guide rail 57a, so as to be movable along the guide axle 56. The flash frame 57 is secured to the frame 33a of the photometric unit 33 through legs 57b and 57c.

Figure 7:
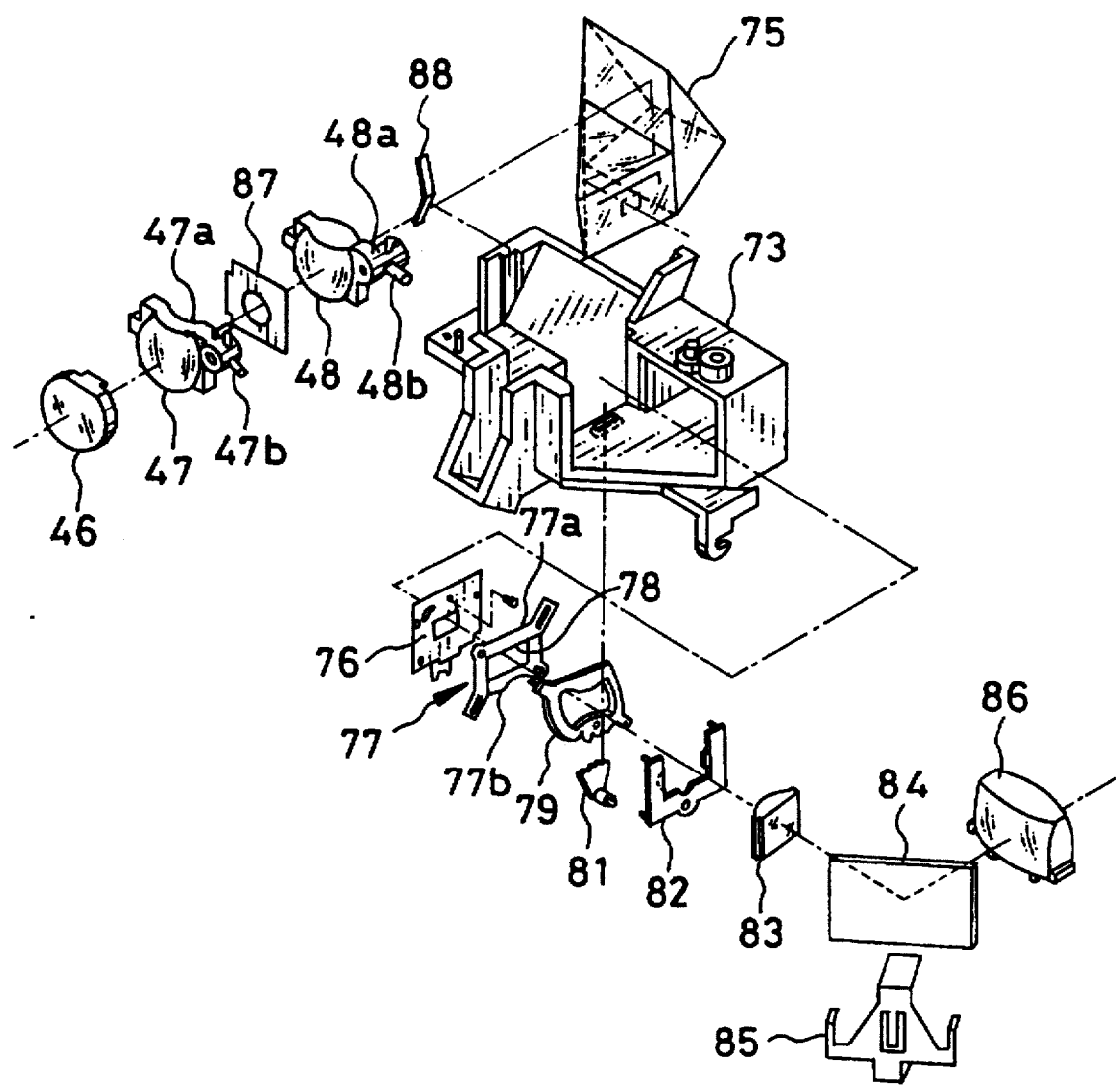
FIG. 7 is an exploded perspective view of the zoom finder.

Referring to FIG. 7 showing the zoom finder 32, a finder frame 73 is secured to the frame 33a of the photometric unit 33. A prism 75, a standard size finder mask 76 with a center opening for the H-size view field, a variable finder mask 77, a view changing lever 79, a switching gear 81, a mask base plate 82, a field lens 83, a mirror 84, a mirror holder 85 and an eyepiece 86 are mounted on the finder frame 73. The prism 75 is placed behind the movable lens 48, and is secured to the finder frame 73 by a holder 88. An extraneous light cutting mask 87 is placed in between the movable lenses 47 and 48. The prism 75.

The prism 75 is provided for making the real image type zoom finder 32 compact by refracting the light path, as the light path length of the real image type is relatively long. Also, the prism 75 refracts optical path of the zoom finder such that the objective lens 46 and the eyepiece 86 are spaced in vertical and horizontal directions of the zoom camera, as well as in an axial direction of the zoom lens 12. Thus, the finder zooming cam 41 and the flash angle changing cam 42 are disposed in a compact fashion in a room formed between the lenses 46 to 48 and the flash projecting portion 36, and above the eyepiece 86.

The variable finder mask 77 consists of a pair of L-shaped plates 77a and 77b arranged to form a rectangular opening 78 in between. The size and aspect ratio of rectangular opening is changeable between the H-size, the C-size and the P-size by moving the L-shaped plates 77a and 77b relative to each other in a diagonal direction of the rectangular opening 78. The L-shaped plates 77a and 77b are moved through the view changing lever 79 which is rotated by the switching gear 81. The switching gear 81 rotates in cooperation with the slide of the view changing switch 28. It is to be noted that print format data corresponding to the selected aspect ratio of the field of view is recorded on a magnetic recording layer of the photo film for each frame, though it is not shown in the drawings.

The camera as set forth above operates as follows:

First, the aspect ratio is selected by sliding the view changing switch 28. To select the P-size, for instance, the view changing switch 28 is set in a position indicated by "P". Then, the view changing lever 79 is rotated to set the rectangular opening 78 of the variable finder mask 77 in the P-size. To change the magnification of the image, either of the zooming buttons 26 and 27 is depressed while framing through the zoom finder 32. Then, a not-shown zoom motor is driven to rotate the zooming gear 34 of the zoom lens 12 forwardly or reversely depending upon which zooming button 26 or 27 is depressed. Rotational movement of the zooming gear 34 is transmitted to the cam 41 through the gear train 30 and the gear 43. As a result, the movable lenses 47 and 48 are moved through sliding of the cam follower pins 47b and is 48b on the cam surfaces 41a and 41b of the cam 41, to set the zoom finder 32 at a magnification corresponding to the magnification of the zoom lens 12.

The rotational movement of the cam 41 is transmitted to the cam 42 through the gears 44 and 45. Thus, the portion 36 engaging the cam 42 moves along the guide axle 56. For example, while the button 26 is depressed, the portion 36 moves rearward, i.e., apart from the flash window 15, to reduce the projection angle and thus the illumination range. While the button 27 is depressed, the portion 36 moves forward, i.e., closer to the flash window 15, to widen the projection angle and the illumination range.

In a moment when the shutter button 25 is depressed, the photometric unit 33 is driven to measure the subject distance and the subject brightness, and the zoom lens 12 is automatically focused before the shutter is released. If the subject brightness is below a predetermined level, the zoom flash 35 automatically projects light from the flash projecting portion 36, synchronously with the shutter release. As described above, the projection angle and the illumination range are adjusted to the focal length of the zoom lens 12. The print format data is magnetically recorded on the photo film while the photo film is advanced one frame for the next exposure.

In the above described embodiment, the objective lens 46 and the movable lenses 47 and 48 are disposed in a higher position than the eyepiece 86, as shown in FIG. 4. But it is possible to dispose the eyepiece 86 in a higher position than other lenses 46 to 48. In that case, the interconnection mechanism 40 is disposed below the eyepiece 86. The prism 75 is provided for making the real image type zoom finder 32 compact by refracting the light path, as the light path length of the real image type is relatively long. Alternatively, it is possible to use a virtual image type finder such as an Albada finder and omit the prism 75.

Although the gear train 30 gearing with the zooming gear 34 for zooming the zoom lens 12 is coupled to the gear 44 of the finder zooming cam 41, it is possible to couple the gear train 30 to a gear secured to the flash angle changing cam 42. It is also possible to couple the zooming gear 34 to both of the cams 41 and 42. In that case, the cams 41 and 42 may be designed to rotate in the same direction, adjusting the contours of their cam surfaces.

Thus, the present invention should not be limited to the above described embodiments but, on the contrary, various modification may be possible to those skilled in the art without departing from the scope of claims attached hereto.

What is claimed is:

1. An interconnection mechanism for a zoom camera having a zoom finder and a flash device, said zoom finder having at least a movable lens element movable to change magnification of said zoom finder in correspondence with magnification of a zoom lens, said flash device having a flash projecting portion movable to change projection angle of light projected from said flash device in accordance with angle of said zoom lens, said interconnection mechanism comprising:

a finder zooming cam rotating in cooperation with said zoom lens being zoomed, said finder zooming cam having a rotational axis extending in parallel to a moving path of said movable lens element, and at least a helicoid cam surface;

a first cam follower member provided on said movable lens and engaged with said helicoid cam surface of said finder zooming cam such that said movable lens element moves along said moving path in response to rotation of said finder zooming cam;

a flash angle changing cam rotating in cooperation with said zoom lens being zoomed, said flash angle changing cam having a rotational axis extending in parallel to said rotational axis of said finder zooming cam, and at least a helicoid cam surface, said flash angle changing cam being disposed adjacent to said finder zooming cam; and a second cam follower member provided on said flash projecting portion and engaged with said helicoid cam surface of said flash angle changing cam such that said flash projecting portion moves in the direction of said rotational axes in response to rotation of said flash angle changing cam.

2. An interconnection mechanism according to claim 1, wherein said flash angle changing cam and said flash projecting portion are mounted to a frame member as an assembly, said assembly being attached to a second frame member supporting said zoom finder and said finder zooming cam.

3. An interconnection mechanism according to claim 1, wherein said zoom finder comprises a prism and a mirror disposed between an objective lens and an eyepiece for refracting optical path of said zoom finder such that said objective lens and said eyepiece being spaced not only in an axial direction of said zoom lens, but also in vertical and horizontal directions perpendicular to said axial direction of said zoom lens, and wherein said flash projecting portion is disposed on a horizontal side of said objective lens such that said finder zooming cam and said flash angle changing cam are disposed in a room formed between said objective lens and said flash projecting portion, and above or below said eyepiece.

4. An interconnection mechanism according to claim 3, wherein said movable lens element is disposed between said objective lens and said prism so as to be movable along an optical axis of said objective lens.

5. An interconnection mechanism according to claim 3, wherein said finder zooming cam and said flash angle changing cam have gears which are respectively coaxial with said rotational axes and are in mesh with each other.

6. An interconnection mechanism according to claim 5, wherein one of said finder zooming cam and said flash angle changing cam is coupled to said zoom lens through a gear train.

* * * * *